Dec. 16, 1941.    J. N. SHARMA    2,266,571
PROCESS FOR COLORING CITRUS FRUIT
Filed May 10, 1939
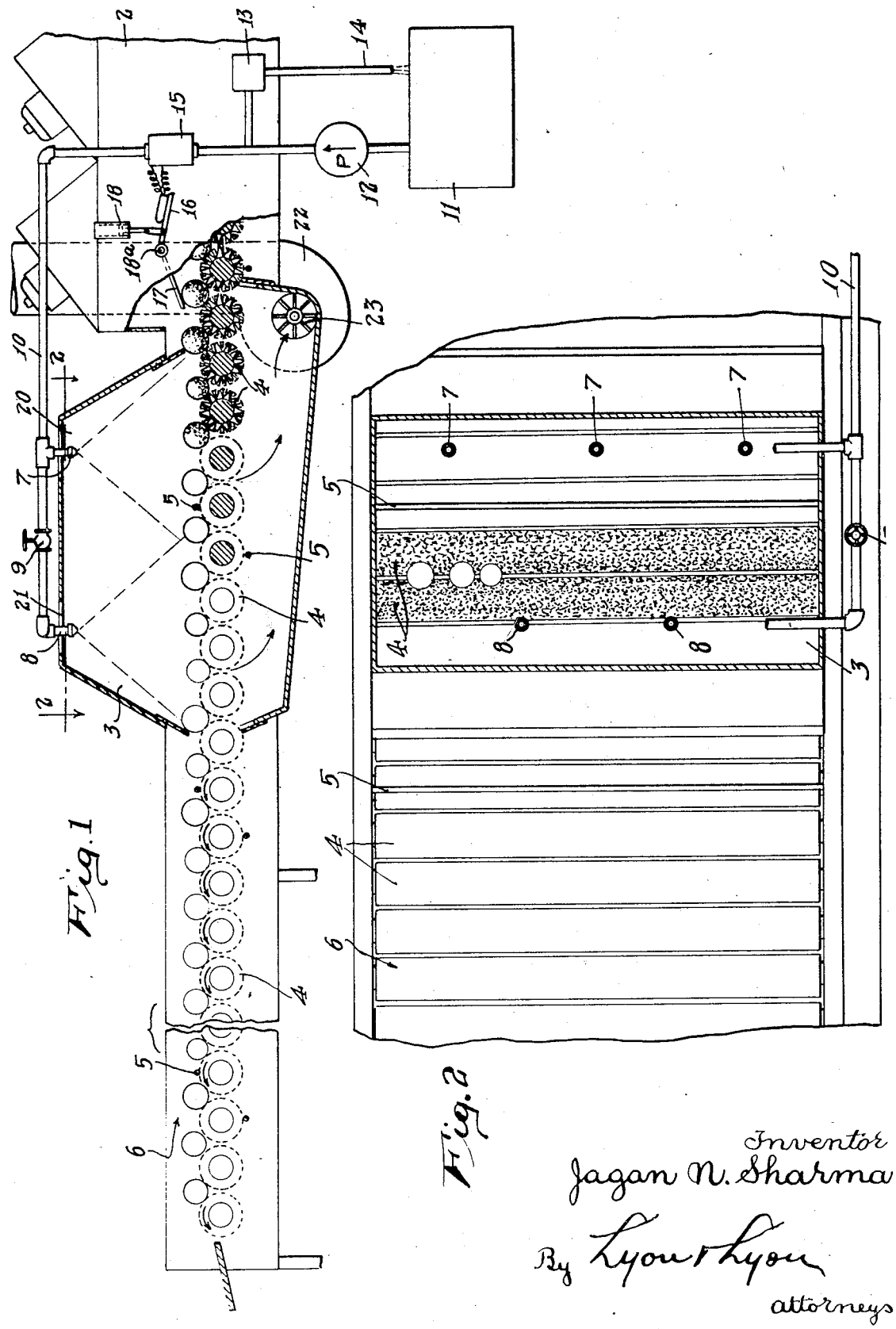
Inventor
Jagan N. Sharma
By Lyon & Lyon
attorneys Patented Dec. 16, 1941

2,266,571

UNITED STATES PATENT OFFICE 2,266,571

PROCESS FOR COLORING CITRUS FRUIT

Jagan N. Sharma, Los Angeles, Calif., assignor to Food Machinery Corporation, San Jose, Calif., a corporation of Delaware Application May 10, 1939, Serial No. 272,781

6 Claims. (Cl. 99—103)

The present invention relates to a process and apparatus for dyeing citrus fruit, particularly oranges, to enhance their natural varietal color.

In accordance with the process and apparatus of the present invention, a dye or coloring material to be applied to the fruit is dissolved in an organic volatile solvent and then sprayed or atomized onto the fruit in a finely divided form.

I employ a volatile solvent which will evaporate properly from the fruit during the process. The volatile solvent employed evaporates in major part very quickly from the fruit, but a small quantity of said solvent resists evaporation sufficiently to maintain the dye or coloring material moist with solvent during a subsequent brushing operation.

I atomize the solution of dye onto the fruit in quantities and under conditions selected to avoid excessive wetting of the fruit by the solvent, such as would result in hardening or burning of the fruit. During the application of the solution to the fruit, I preferably brush and advance the fruit. In the process the fruit which is being subjected to the combined brushing and spraying is moistened or wetted to a limited extent only by the solvent, so that while apparently wet by the solvent the fruit when removed from underneath the spray contains a thin oily film of solvent.

From the combined brushing and spraying operation I pass the fruit through a subsequent brushing operation, wherein the fruit is brushed to cause the dye or color to impregnate the skin of the fruit. The initial spraying and brushing operation will not of itself effect the desired enhancement of the varietal color of the fruit, and the subsequent brushing operation is essential in order to cause the dye to properly impregnate the skin of the fruit. During the subsequent brushing operation, there is a minor quantity only of the solvent present on the fruit. The solvent present during such subsequent brushing operation is in insufficient quantity to effect any apparent wetting of the brushes, and the fruit while subjected to such subsequent brushing operation retains thereon only a quantity of solvent sufficient to cause the fruit to glisten somewhat and feel oily to the touch. The minor quantity of solvent present on the fruit during subsequent brushing operations while appreciably more resistant to evaporation than the greater part of the solvent, which evaporates almost simultaneously with the initial spraying operations, is sufficiently volatile to be evaporated completely from the fruit during the said subsequent brushing operations. All of the solvent applied to the fruit, including that which is present during the subsequent brushing operations, is sufficiently volatile to be removed from the fruit in about 20 seconds, and not over one minute from the initial spraying operation.

The application to the skin of citrus fruit of an organic solvent is normally associated with the danger of deterioration of the skin of the fruit, and this is particularly true whenever the application of an organic solvent to the skin of the fruit is accompanied by the operation of brushing the fruit. It is the discovery of the present invention that an organic solvent may be applied in the manner indicated to citrus fruit while brushing the fruit without damaging the skin of the fruit.

In the process and apparatus of the present invention the major portion of the solvent is evaporated quickly during the spraying step and previous to the subsequent brushing operations, while a minor residual supply of solvent is provided for wetting the dye in the subsequent brushing step through the employment of a solvent of proper composition. The solvent employed for the process of the present invention is formed of constituents, nearly all of which have a high degree of volatility, but a small portion of which is sufficiently less volatile to be retained on the fruit during a part at least of the subsequent brushing operation. It is the discovery of the present invention that if the solvent contains only constituents which are highly volatile (for example, a solvent having a boiling point range of 140 to 160° F.) there will be insufficient solvent left on the fruit after the completion of the spraying operation to properly moisten the dye to allow the dye to be impregnated into the fruit by the subsequent brushing step. The solvent should, therefore, include a minor quantity of the relatively less volatile constituents.

The process and apparatus of the present invention, together with various additional objects and advantages thereof, will best be understood from a description of a preferred form or example of a process and apparatus embodying the invention. For this purpose, I have hereinafter described such a preferred form of process and apparatus in connection with the accompanying drawing, in which—

Figure 1 is a somewhat diagrammatic elevation mainly in vertical section.

Figure 2 is a fragmentary plan view.

Referring to the drawing, the apparatus and process of the present invention may be used in connection with any usual or preferred means for washing the scale or dust from the fruit and drying the fruit. In the particular case illustrated, the apparatus is indicated as connected to a drier 2, which may be of any desired type. The operation of spraying the solution of dye onto the fruit is performed in a chamber 3 through which the fruit is adapted to be passed by a series of brushes 4. The brushes 4 may be of any usual or preferred type. I prefer to employ brushes of the type which are arranged transversely to the direction of flow of the fruit to form valleys therebetween in which the fruit will be maintained until displaced by the feeding of additional fruit onto said brushes. Associated with such brushes are provided so-called clean-out rods 5, which may be actuated by chains (not shown) in any usual or preferred manner. For example, the brushes 4 and clean-out rods 5 of the apparatus of the present invention may be formed and operated in accordance with the disclosure of the Paxton Patent No. 2,099,226, issued November 16, 1937. The brushes 4 and clean-out mechanism, including the rods 5 of the apparatus of the present invention, if desired, may be a continuation of the brushes and clean-out mechanism used in the drier 2, and the brushes and clean-out mechanism may extend through the spraying chamber 3 to provide a subsequent brushing path 6.

Within the chamber 3 there is provided a row of nozzles 7 and a further row of nozzles 8. These nozzles are of a type designed to atomize the solution fed thereto into a finely divided spray. Two rows of nozzles are shown, the nozzles of the row 7 being preferably staggered with relation to the nozzles of the row 8. This is for the purpose of providing a sufficient spray area to properly apply the coloring solution to the fruit when the apparatus is employed for rapid handling of a large volume of fruit.

In the process and apparatus of the present invention the fruit should be sprayed with the coloring solution for a period of from 1 to 10 seconds, and preferably about 3 seconds. When handling large volumes of fruit, the fruit may pass over about eight brushes in such a spraying operation, and it is for the purpose of causing the spray to cover such an area of brushes that two rows of nozzles 7 and 8 are indicated. When the process and apparatus of the present invention are operated at a slower speed, one of the rows of nozzles may be closed by means of the valve 9.

The nozzles 7 and 8 are indicated as connected by a line 10 with the tank 11, which is intended to hold a solution of dyeing material. Such line 10 is indicated as preferably provided with a pump 12, a pressure valve 13, and by-pass line 14. There is also indicated a magnetic valve 15, electrically controlled by a switch 16, connected with fingers 17 pivoted as indicated at 18* in position to be actuated by the entrance of fruit into the spraying chamber 3. As the fruit enters the spraying chamber 3, the fingers 17 are actuated to open the magnetic valve 15 to permit the pump 12 to deliver the coloring solution to the nozzles 7 and 8. When the supply of fruit to the machine stops, fingers 17 may move down to close the magnetic valve 15. The dash pot 19 is adjusted to delay the closing of the valve 15 until fruit passing the fingers 17 has had time to be cleaned out of the spray chamber 3. In this way, the apparatus of the present invention may avoid spraying the dye solution into the chamber 3 in the absence of fruit therein, which might cause an undesired saturation of the brushes with the dyeing material.

In order to cause the particles of the solution of dyeing material which are atomized from the nozzles 7 and 8 to be properly impinged against the fruit, I provide air intake openings 20 and 21 around the nozzles 7 and 8, and below the brushes 4 the chamber communicates with an exhaust line 22 in which is positioned an exhaust fan 23. By means of the exhaust fan 23 a current of air may be drawn into the chamber 3 so as to forcibly direct the atomized particles of the dyeing solution against the fruit on the brushes 4. It is to be understood in practice that the rate of air supply should be controlled by the operation of the chain 23 so as to avoid the formation within the enclosed chamber 3 of an explosive mixture.

In practice, the process and apparatus of the present invention is operated to enhance the varietal color of citrus fruit in the following manner:

A suitable dye is first dissolved in a volatile organic solvent and placed within the tank 11. The dye or coloring substance to be used is preferably an ortho-toluidine, beta-naphthol type, but it is to be understood that any usual or well known oil soluble dye for enhancing the varietal color of citrus fruit may be used, if desired. The proportion of dye to solvent is preferably ¼% by weight of the dye, although the amount of dye may vary considerably in practice. As the volatile organic solvent I have used, for example, a petroleum distillate having an initial boiling point of 140° F. and an end boiling point of 270° F., substantially 90% of which mixture has an end point below 190° F. Such a solvent satisfactorily corresponds to the prerequisites of the present invention in that nearly all thereof will rapidly evaporate, but the same contains a minor percentage of relatively higher boiling point volatile ends which will remain with the fruit during the hereinafter mentioned brushing operations. As a further example of a suitable solvent for the process, I have employed a solvent having an initial boiling point of about 140° F., and an end point of about 350° F., said solvent having been produced by mixing 70 parts of a petroleum distillate having a boiling point range of 140 to 160° F., with 30 parts of a petroleum distillate having a boiling point range of 190° F. to 350° F. In general, I prefer to employ a solvent capable of separation into two fractions, one containing about 70% of the solvent and having an end point below 200° F., and the other having an end point below about 350° F.

It will be seen that the major portion of such solvents will volatilize readily and rapidly at atmospheric temperature, while a very small portion thereof will volatilize at a slower rate.

In operation of the process the fruit is advanced over the brushes 4 after being properly washed and dried and caused to enter the spraying chamber 3. As the fruit enters the spraying chamber 3 the valve 15 is automatically actuated to commence the spraying operation. The spraying nozzles 7 and 8 are preferably of the hydraulic pressure type and are supplied with solvent under pressure of pump 12 or about 45 pounds per square inch, which may vary from 30 to 100 pounds per square inch without marked variation in the results of the operation. The nozzles of the preferred apparatus are approximately 11 inches above the fruit on the brushes 4 and pointed straight down, as indicated. The rate of feed of fruit during the process is preferably conducted so that the fruit remains subject to the atomized particles produced by the nozzles 7 and 8 for a preferred period of about 3 seconds. As indicated, however, such period may vary from 1 to 10 seconds, depending upon operating conditions. During the atomization of the solution into the chamber 3 by nozzles 7 and 8 the exhaust fan 23 is actuated so as to create a current of air to cause the atomized particles to be impinged directly against the fruit on the brushes 4. Simultaneously, the fruit is rotated by the brushes 4 so as to successively expose all the surfaces thereof to the atomized particles of the solution.

Within the spraying chamber 3 the quantity of dyeing solution sprayed onto the fruit is sufficient to somewhat wet the fruit without, however, applying sufficient of the solution to the fruit as to cause the same to run on the surface of the fruit or drip therefrom. If the fruit should be flooded with dye in the chamber 3 the skin of the fruit will become deteriorated, so that upon subsequent storage it will become hardened or burned in appearance.

From the spraying chamber 3 the fruit is carried by the brushes 4 immediately along the brushing path 6 where the fruit is subjected to further brushing operations. The fruit, if taken immediately from the outlet of the spray chamber 3 and the solvent permitted to evaporate, will not have the desired enhancement of the varietal color and subsequent brushing is necessary. Subsequent brushing, in the neighborhood of about 20 seconds, is desired, although this may vary from 10 to 60 seconds. Generally, the period of the subsequent brushing of the fruit should materially exceed the time during which the fruit is subjected to combined brushing and spraying. The solvent employed in the process is nearly all evaporated from the fruit immediately after the fruit exits from the spray chamber 3, so that with the possible exception of the first one or two brushes the brushing of the fruit on the passage 6 is carried on without any visible wetting or dampening of the brushes with solvent. However, during this brushing operation it is essential that a small portion of the solvent still be retained on the fruit, such as would render the dye more susceptible to impregnating the skin of the fruit. Even the higher boiling point portion of the solvent is preferably sufficiently volatile so that at the end of the brush-way 6 the solvent has been substantially completely evaporated.

As a result of the process and apparatus of the present invention, the coloring substance is evenly distributed over the skin or peel of the fruit, developing a substantially uniform natural varietal color on the fruit. There is no substantial deterioration of the skin of the fruit or burning due to the brushing and coloring operations. The process is quickly applied with a minimum of apparatus, and dispenses with the necessity of employing any heat treatment of the fruit for this purpose. Subsequent to the coloring operation, the fruit, if desired, may be waxed or polished in any desired or preferred manner and shipped to the market.

While the particular process and apparatus herein described are well adapted for carrying out the objects of the present invention, it is to be understood that various modifications and changes may be made without departing from the principles of the present invention, and the present invention includes all such modifications and changes as come within the scope of the appended claims.

I claim:

1. A method of enhancing the varietal color of citrus fruit, which comprises forming a solution of dye in a volatile organic solvent nearly all of which is relatively highly volatile but containing a minor portion of relatively lower volatile constituents, spraying the solution onto the fruit and evaporating most of the solvent from the fruit, and thereafter, while the fruit retains residual solvent in an amount sufficient to form a light oil film but insufficient to perceptibly wet the brushes contacting therewith, brushing the fruit to cause the dye to impregnate the skin of the fruit until completion of the evaporation of such residual solvent.

2. A method of enhancing the varietal color of citrus fruit, which comprises forming a solution of dye in a volatile solvent consisting principally of relatively highly volatile constituents and a minor portion of relatively less volatile constituents, spraying the solution onto the fruit while subjecting the fruit to brushing, subjecting the fruit to a subsequent brushing operation of greater duration to cause the dye to impregnate the skin of the fruit, evaporating the major portion of the solvent in the first spraying and brushing operation, and evaporating the residual solvent to dryness during said subsequent operation.

3. A process of treating citrus fruit to enhance the varietal color of the citrus fruit, which comprises forming a solution of dye in a volatile solvent all of which may be evaporated when brushing the fruit in the presence of the solvent at atmospheric temperature in a period of time of less than one minute, said solvent containing a principal part of relatively highly volatile constituents and a minor part of less volatile constituents, spraying the solution onto the fruit, causing evaporation of the principal portion of the solvent, and subsequently brushing the fruit to cause the dye to impregnate the skin of the fruit and complete the evaporation of the solvent.

4. A process of treating fresh citrus fruit to enhance the natural varietal color thereof, which comprises forming a solution of dye in an organic solvent, atomizing said solution into finely divided form, impinging the atomized particles against the fruit, and rubbing the fruit while moist with said solution to impregnate the fruit skin with said dye, the volatility of said solvent and the quantity thereof applied to the fruit being such that said solvent substantially completely evaporates from the fruit during said brushing operation in not more than about one minute.

5. The process of treating fresh citrus fruit to enhance the natural varietal color thereof, which comprises the steps of forming a solution of dye in an organic volatile solvent, atomizing said solution into finely divided form, impinging the atomized particles against the fruit and rubbing the fruit for a sufficient period to impregnate the skin of the fruit with said dye to impart the desired coloration thereto, said solvent being of such volatility and the solution being applied to the fruit in such limited quantities as to cause the solvent to evaporate with sufficient rapidity to prevent injury to the fruit from the effect of said solvent and brushing actions.

6. A process of treating fresh citrus fruit to enhance the varietal color thereof, which comprises applying a film of an organic solvent carrying an oil soluble dye to said fruit, said solvent having a boiling point range within the limits of about 140-350° F. and brushing said fruit while sufficiently moist with said solvent to effect the impregnation of the peel of said fruit with said dye, said solution being applied to the fruit in such limited quantities as to cause the solvent to evaporate with such rapidity as to prevent injury to the fruit from the effect of such solvent and said brushing.

JAGAN N. SHARMA.